United States Patent
Daum et al.

(10) Patent No.: US 12,455,243 B2
(45) Date of Patent: Oct. 28, 2025

(54) SINGLE-PHOTON IMAGING SYSTEM WITH RECONFIGURABLE CONTROLLER FOR RAPID SWITCHING BETWEEN IMAGING MODES

(71) Applicant: FEI DEUTSCHLAND GMBH, Dreieich (DE)

(72) Inventors: Rainer Daum, Gräfelfing (DE); Bruce Pirger, Berkshire, NY (US)

(73) Assignee: Life Technologies Corporation, Carlsbad, CA (US)

( * ) Notice: Subject to any disclaimer, the term of this patent is extended or adjusted under 35 U.S.C. 154(b) by 376 days.

(21) Appl. No.: 18/032,331

(22) PCT Filed: Oct. 20, 2021

(86) PCT No.: PCT/IB2021/059629
§ 371 (c)(1),
(2) Date: Apr. 17, 2023

(87) PCT Pub. No.: WO2022/084858
PCT Pub. Date: Apr. 28, 2022

(65) Prior Publication Data
US 2023/0384225 A1    Nov. 30, 2023

Related U.S. Application Data

(60) Provisional application No. 63/094,135, filed on Oct. 20, 2020.

(51) Int. Cl.
*G01N 21/64*     (2006.01)
*G01N 21/65*     (2006.01)

(52) U.S. Cl.
CPC ..... *G01N 21/6458* (2013.01); *G01N 21/6408* (2013.01); *G01N 21/65* (2013.01)

(58) Field of Classification Search
None
See application file for complete search history.

(56) References Cited

U.S. PATENT DOCUMENTS

| | | | |
|---|---|---|---|
| 9,395,247 B2 * | 7/2016 | Kostamovaara | G01J 3/4406 |
| 11,274,963 B2 * | 3/2022 | Tebrügge | G01J 1/44 |
| 11,480,514 B2 * | 10/2022 | Loinaz | G01N 15/1484 |
| 2013/0342835 A1 * | 12/2013 | Blacksberg | G01J 3/2889 |
| | | | 356/318 |
| 2014/0231675 A1 * | 8/2014 | Mohler | G01N 21/6458 |
| | | | 250/459.1 |
| 2015/0369666 A1 * | 12/2015 | Kostamovaara | G01N 21/65 |
| | | | 250/459.1 |
| 2019/0383661 A1 * | 12/2019 | Tebrügge | G01N 21/65 |

* cited by examiner

*Primary Examiner* — David P Porta
*Assistant Examiner* — Djura Malevic

(57) ABSTRACT

An imaging system having one or more single-photon detectors is configured to enable rapid switching between different operational modes. The imaging system includes a reprogrammable controller communicatively coupled to one or more single-photon detectors and to a host computer device via a high-speed data link. In operation, the one or more single-photon detectors are operated according to a first operational mode. A reprogrammable logic device of the controller is then reconfigured to operate the one or more single-photon detectors in a second operational mode without requiring changes to the overall hardware configuration/setup of the imaging system.

20 Claims, 6 Drawing Sheets

SINGLE-PHOTON IMAGING SYSTEM WITH RECONFIGURABLE CONTROLLER FOR RAPID SWITCHING BETWEEN IMAGING MODES

CROSS-REFERENCE TO RELATED APPLICATION

This application is a national stage application, filed under 35 U.S.C § 371, of International Patent Application PCT/IB2021/059629, filed on Oct. 19, 2021, which claims the benefit of priority to U.S. Provisional Application No. 63/094,135, filed on Oct. 20, 2020, which is incorporated by reference herein in its entirety.

BACKGROUND

Technical Field

This disclosure relates generally to multipixel photon counter imaging systems. More specifically, the present disclosure relates to microscopy imaging systems with a reconfigurable control circuit capable of controlling one or more high-speed single-photon detectors (i.e., photon counters) and rapidly switching between various operational modes with limited or no need to reconfigure control circuit hardware.

Related Technology

A single-photon detector (SPD) is a device configured to emit a signal for each photon detected, as opposed to standard photodetectors, which are unable to resolve single photon events and are configured to generate a signal proportional to the photon flux. Typically, for a given field of view and measurement period, the total number of signal pulses are counted and the result is an integer number taken to correspond to the number of counted photons, with the caveats that inaccuracies can result from exceeding the maximum count rate or from excessive numbers of photons arriving during detector dead times between counts.

In imaging and spectroscopy applications, single-photon detection technologies have enhanced the ability to obtain information about various molecular processes in biological systems. The development of single-photon avalanche diodes (SPADs) and their integration with CMOS technologies has helped to further these advances. Such single-photon counting sensors have been utilized in various microscopy applications, including, for example, fluorescence lifetime imaging (FLIM), fluorescence correlation spectroscopy (FCS), super-resolution microscopy (SRM), Raman spectroscopy, and near-infra-red optical tomography (NIROT).

Unfortunately, these sensors require very detailed timing control to operate and they generate digital data at extremely high rates. Conventional interfaces between image sensors and host computer devices do not provide the speed necessary to handle such data rates. Such high-speed data rates, often reaching several Gbps of data over sustained periods of time, can also quickly overwhelm a host computer device's memory. Further, recording data to disk at these speeds is not possible with conventional spinning disks. At least in part because of these limitations, currently available SPAD platforms are each typically fixed to a very specific application.

Accordingly, there are a number of disadvantages with current single-photon detection systems and methods that can be addressed.

BRIEF SUMMARY

Implementations of the present disclosure solve one or more of the foregoing or other problems in the art of single-photon imaging systems. In particular, one or more embodiments can include an imaging system configured to enable real-time switching between different operational modes (e.g., within a single experimental setup), through a reconfiguration of the software associated with the reprogrammable logic device of the imaging system controller, without requiring a change of the imaging system controller at the hardware level.

In one embodiment, the imaging system comprises an imaging system controller. The controller includes a reprogrammable logic device comprising memory, one or more input/output connectors, and a high-speed data link. The imaging system further includes an imaging sensor (or multiple imaging sensors) communicatively coupled to the controller via the one or more input/output connectors, and a host device communicatively coupled to the controller via the high-speed data link.

The host device includes one or more processors and one or more hardware storage devices having stored thereon computer-executable instructions that when executed by the one or more processors cause the host device to: operate the imaging sensor according to a first operational mode; receive imaging data from the imaging system controller during operation of the first operational mode; reconfigure the reprogrammable logic device of the imaging system controller according to a second operational mode; instruct the imaging system controller to operate the imaging sensor according to the second operational mode, the second operational mode differing from the first operational mode; and receive imaging data from the imaging system controller during operation of the second operational mode.

In some embodiments, the imaging sensor is a single-photon detector, such as a SPAD.

In some embodiments, the host device operates to switch the imaging system from the first operational mode to the second operational mode by adjusting a time gating parameter in real-time. For example, the first operational mode may comprise Raman spectroscopy and the second operational mode may comprise time-delayed detection of fluorescence after light pulse excitation, or vice versa. In some instances, real-time photon detection is synchronized with the pulsed light source so as to enable a mode that successively alternates between Raman and fluorescence detection, and to thereby enable simultaneous viewing of the Raman and fluorescence signals (e.g., in separate images).

The Raman spectroscopy mode may comprise high-speed gating (e.g., within a range of hundreds of picoseconds to tens of nanoseconds) to separate background fluorescence emissions from Raman scattering signals. The time-delayed detection of fluorescence mode may comprise a time gating delay configured to capture fluorescence emissions while substantially blocking excitation light signals. For example, the time gating delay may be synchronized to an excitation light source signal so as to enable the imaging sensor to capture the fluorescence emission after the excitation light ceases.

In some embodiments, the first and second operational modes comprise different portions of a shifting time gating delay through several repetitive photon acquisitions, such as in a fluorescence lifetime imaging microscopy (FLIM) application or a fluorescence recovery after photobleaching (FRAP) application, for example. The host device may be further configured to determine a fluorescence decay curve or other fluorescence decay parameters based on imaging data corresponding to the shifting time gating delay of the FLIM mode, and/or a recovery time constant or other recovery time parameters based on imaging data corresponding to the shifting time gating delay of the FRAP mode.

In some embodiments, the first operational mode includes a calibration operation, while the second operational mode comprises a higher-speed photon counting mode. For example, in 3D fluorescence cross correlation spectroscopy (iFCCS), the calibration operation can be part of a photon integration mode to register a 3D interferometric optics calibration of the system. The interferometric photon counting mode can be the photon counting portion of the iFCCS operation. In such a configuration, the optics point spread function (PSF) delivers the spatial localization of the emitter. Interferometry reveals the spatial (axial) information of the emitter via the phase of the photon, whereas the timing of the photon events reveals the correlation characteristics of the emitter. The time correlation function of the emitter is descriptive of various dynamics of molecules (diffusion, conformal changes, rotational, vibrational modes, etcetera). The time correlation data can thus be used to identify particular emitters from a larger set of emitters at the same pixel.

In some embodiments, the reprogrammable logic device comprises a field-programmable gate array (FPGA), and the high-speed data link is configured according to Peripheral Component Interconnect Express (PCIe).

In some embodiments, the host device includes or is connected to storage memory comprising one or more solid-state drives (SSDs). The SSDs may comprise a Non-Volatile Memory Express (NVMe) bus and/or be provided as a Redundant Array of Independent Disks (RAID).

Accordingly, systems and methods enabling rapid (i.e., real-time) switching between different imaging modes in a single-photon imaging system are disclosed. Benefits of the imaging systems disclosed herein include the ability to rapidly adjust the light source and/or sensor configurations between different operating modes such as a photon counting mode, a discrimination mode that utilizes time gating (e.g., to discriminate between Raman signals and fluorescence), and/or a repetitive sampling mode with shifting time gating (e.g., FLIM or FRAP). The rapid switching between modes, through reconfiguration of the sensor and/or light source, can beneficially be under control of the operational protocol within a single experimental setup, without the need for manual intervention of the user, and the time to switch may be about 1 second or less (e.g., μs range).

Benefits may also include photon counting in substantially real-time, with precise time stamping (e.g., at sub time resolution of the sensor) of the photon events being stored in memory (e.g., with latency of less than one or two frames of the sensor). Benefits may also include full digitization of photon events from the sensor to the host device memory, without the need for conventional analog to digital conversion. In some embodiments, a controller/processer unit may be coupled with the sensor or sensor array to enable data processing (e.g., calculations related to autocorrelation function, decay time and/or partial least square fit, and the like) on the sensor or sensor array itself. Such a design can condense the data flow to the host device and/or increase the data content from the sensor or sensor array.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

Overview of Imaging System Hardware Platform

Figure 1:
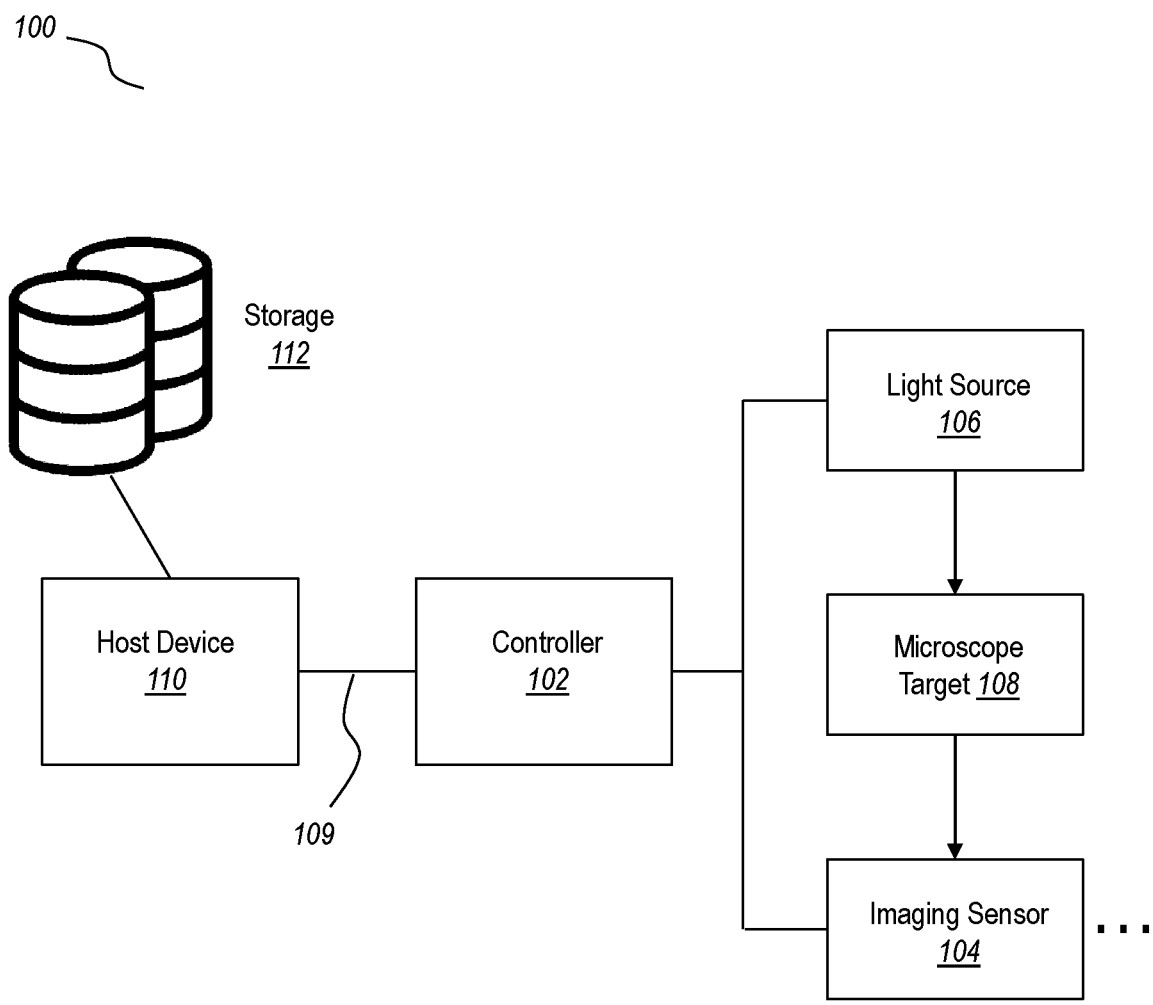
FIG. 1 illustrates an exemplary imaging system hardware platform with a reconfigurable controller configured to provide rapid switching between different imaging modes.

FIG. 1 illustrates an exemplary hardware platform for imaging system 100, with a reconfigurable controller 102 configured to provide rapid switching between different imaging modes. As mentioned above, conventional microscopy systems that utilize single-photon detectors are limited by the demands for detailed timing control and the generation of digital data at extremely high rates. As a result, currently available platforms are typically fixed to a very specific application and do not provide the ability to easily or rapidly switch (e.g., in real-time) between imaging modes. For example, conventional platforms are unable to provide real-time switching from a photon counting mode to FLIM or FRAP, or real-time switching between Raman and fluorescence in order to show both in separate images. In contrast, the illustrated imaging system 100 is capable of managing the high data rates associated with one or more single-photon sensors and enables rapid switching between different operational modes.

As used herein, the term "rapid switching" between operational/imaging modes is used synonymously with the term "real-time switching". These terms mean that the imaging system is able to switch from a first operational mode to a second operational mode without the need to adjust the overall hardware configuration of the imaging system. That is, the imaging system may be switched from a first operational mode to a second operational mode through a reconfiguration of the software associated with the reprogrammable logic device of the imaging system controller, without requiring a change of the imaging system controller at the hardware level. In many instances, the "rapid"/"real-time" switch from a first operational mode to a second operational mode also does not require a hardware-level change of the imaging sensor(s) of the imaging system. For example, different modes of operation can be effectively carried out using the same sensor(s), without the need to change/swap imaging sensors between operational modes. The time to switch modes can therefore be known, and can be relatively fast compared to the molecular processes intended for imaging.

The imaging systems described herein therefore beneficially allow for switching between different imaging modes within a single experimental setup. For example, the timing of an experiment and the mode switching is under full control of the operational protocol set by the user, without the need for manual intervention or adjustment during the course of the experiment. The time for switching between imaging modes may be, for example, no more than about 2-3 seconds, more likely no more than about 1 second, such as within the μs range (e.g., 10 μs may be "fast" for imaging diffusion of cellular particles), or even within the ns range (e.g., slow conformal changes in molecular structure may happen on a scale of about 10 ns).

The controller 102 of the hardware platform 100 is communicatively coupled to an imaging sensor 104. As indicated by the ellipses, the controller 102 may be coupled to multiple imaging sensors (such as in the case of iFCCS, for example). For convenience, the following description will refer to a single imaging sensor 104. The imaging sensor 104 may be a single-photon detector, such as a SPAD or other type of single-photon detector.

The controller 102 is also communicatively coupled to a light source 106. The controller 102 directs operation of the light source 106 to provide light to the microscope target 108, and receives resulting imaging data from the imaging sensor 104. The type of light source 106 used depends on the particular microscopy application for which the imaging system 100 is configured. The light source 106 may be a continuous wave light source or a pulsed laser light source, for example. The light source 106 may be reconfigurable. In some embodiments, multiple light sources 106 may be included. For example, switching between operational modes may include reconfiguring the light source and/or switching light sources in addition to or alternative to reconfiguring the imaging sensor(s). This may include switching to or from an operational mode where a light source is not utilized. For example, some Western blotting protocols, or portions thereof, may not require a light source.

Various examples of microscopy applications for which the imaging system 100 may be utilized are described below. Applications include, for example, Raman spectroscopy, time-delayed detection of fluorescence, time resolved fluorescence applications such as FLIM and FRAP, (3D) fluorescence correlation spectroscopy (FCS) applications (e.g., iFCCS), super-resolution microscopy (SRM), optical tomography applications (e.g., near-infra-red optical tomography (NIROT)), and 3D sectioning applications (e.g., spinning disk confocal microscopy and/or structured illumination microscopy (SIM) applications).

The controller 102 is also communicatively coupled to a host computer device 110. For simplicity, the host device 110 is shown here as a single device, but it will be understood that other configurations are also possible. For example, the controller 102 may be coupled to a network of multiple host devices and/or be part of a distributed computational system. The controller 102 is coupled to the host device 110 via a high-speed data link 109. In a presently preferred embodiment, the high-speed data link 109 is configured according to the PCIe standard.

As used herein, a "high-speed data link" is one that provides a transfer rate to the host computer device sufficient to enable effective delivery of imaging data generated during a desired photon detection operational mode. Various examples of such operational modes are provided herein. At present, a "high-speed data link" is one capable of providing a transfer rate of greater than 1 Gbps, such as about 5 Gbps or more, or about 15 Gbps or more, or about 25 Gbps or more, or about 35 Gbps or more, or about 45 Gbps or more, or about 55 Gbps or more, or about 64 Gbps or more. In functional terms, for example, the system 100 with high-speed data link 109 enables storage of time stamped photon counts at substantially real-time rates (e.g., with latency of less than one or two frames of the corresponding sensor). The system 100 is also able to provide full digitization of photon events from the sensor to the host device storage 112, without the need for a conventional analog to digital conversion and without the need to continuously integrate the data.

Of course, other operational modes that utilize single-photon devices and/or other data-link hardware configurations will be developed in the future, and the "high-speed data link" embodiments described herein are not necessarily limited to the examples specifically described herein. One of skill in the art is able to utilize future developments in data bus technology and single-photon detector technology within the inventive framework of the imaging systems described herein.

The high-speed data link 109 is also preferably configured to provide data to the host device 110 in a manner that does not require further conversion of the data at the host device interface board. As mentioned above, PCIe is a presently preferred configuration of the high-speed data link 109, and data sent via PCIe to the host device 110 is readily usable by the host device 110 with minimal (or no) required conversion to some other format.

The host device 110 may include and/or may be communicatively coupled to storage memory 112. Storage memory 112 may be utilized for storage of the imaging data send via the high-speed data link 109. As briefly mentioned above, the rate of data generated by single-photon detectors can quickly overwhelm a host device's memory and ability to write the data to storage. In particular, conventional spinning disk storage means write data fast enough to keep pace with the data rates involved with many single-photon detection applications.

Storage memory 112 may therefore comprise one or more SSDs. In presently preferred embodiments, the one or more SSDs comprise a NVMe bus and/or are arranged as a RAID (e.g., RAID 0 configuration or other suitable configuration). This type of configuration for the storage memory 112 has been found to be capable of providing data writing rates that substantially meet the data transfer rates of the high-speed data link 109.

Figure 2:
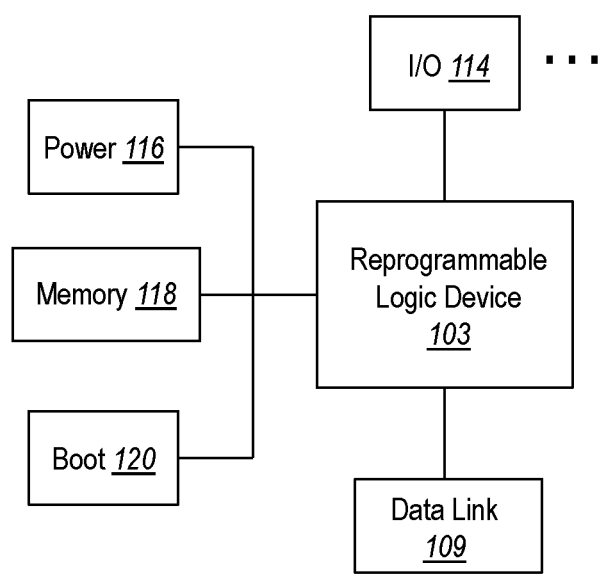
FIG. 2 is a more detailed view of the controller of the imaging system of FIG. 1.

FIG. 2 illustrates a more detailed view of the controller 102. As shown, the controller 102 includes a reprogrammable logic device 103. The reprogrammable logic device 103 may be provided as a FPGA, for example. The reprogrammable logic device 103 may be reprogrammed by the host device 110 (or other computer device connected to the reprogrammable logic device 103) via the high-speed data link 109. The ability to reconfigure the controller 102 in this manner beneficially enables the imaging sensor 104 to function according to different operating modes, as explained in greater detail below.

The reprogrammable logic device 103 includes one or more input/output connectors 114 for connecting to the one or more imaging sensors or to other components of the imaging system. One or more of the input/output connectors 114 may comprise a plurality of pins configured as differential pairs, such as an arrangement configured for low-voltage differential signaling (LVDS). Any suitable number of pins may be included to enable a desired number of connections to the reprogrammable logic device 103. Presently preferred embodiments comprise at least 128 pins, or at least 256 pins, or at least about 300 pins.

The reprogrammable logic device 103 also includes a power source 116 and/or suitable power connection and memory 118. According to a presently preferred embodiment, the memory 118 includes synchronous dynamic random-access memory (SDRAM) such as double data rate (DDR) SDRAM, for example DDR4 SDRAM. The reprogrammable logic device 103 may also include a boot 120 (e.g., boot flash) to initialize the reprogrammable logic device 103 at power-up.

Various examples of operational modes and mode-switching procedures that the imaging system 100 can provide are described below. It will be understood that although these operational modes are representative of the beneficial uses of the imaging system 100, they are not intended to represent a complete list of all of the operational modes and mode-switching procedures possible for the system 100.

Automatic Exposure Limits

In one example, the imaging system 100 can beneficially be configured to automatically control exposure in order to, for example, minimize photobleaching of a sample. In one embodiment, the controller 102 and/or host device 110 tallies the number of fluorescence photons counted by the imaging sensor 104 until a limit/threshold is reached. At that point, the light source 106 is adjusted to stop exposure. The obtained photon data may then be utilized, for example, by summing up an intensity image.

Time Gating/Discrimination

The imaging system 100 can beneficially provide multiple operating/imaging modes through reconfiguration of one or more parameters of the imaging sensor 104 as controlled by the controller 102. One example of such a parameter is time gating. That is, by controlling the particular time window time at which the imaging sensor 104 is actively measuring photons, the type of imaging application can be established. Because the imaging system 100 is configured to be readily reconfigurable, the time gating parameter may be adjusted to rapidly switch from a first operational mode to a second operational mode using the same overall hardware configuration and even the same experimental setup (e.g., same sample run and/or same microscope target).

In one example, the imaging system 100 may be configured for a Raman spectroscopy application. The time-gating may be tuned to separate background fluorescence emissions from Raman scattering signals. Raman spectroscopy provides information on the chemical compositions and molecular structures of a target/sample in a non-destructive and label-free manner. The Raman scattering signal occurs due to the scattering of light caused by the chemical bonds within the sample material. While most of the scattered light is the same wavelength as the laser source, a small amount of light is scattered at different wavelengths and provides useful information.

Figure 3:
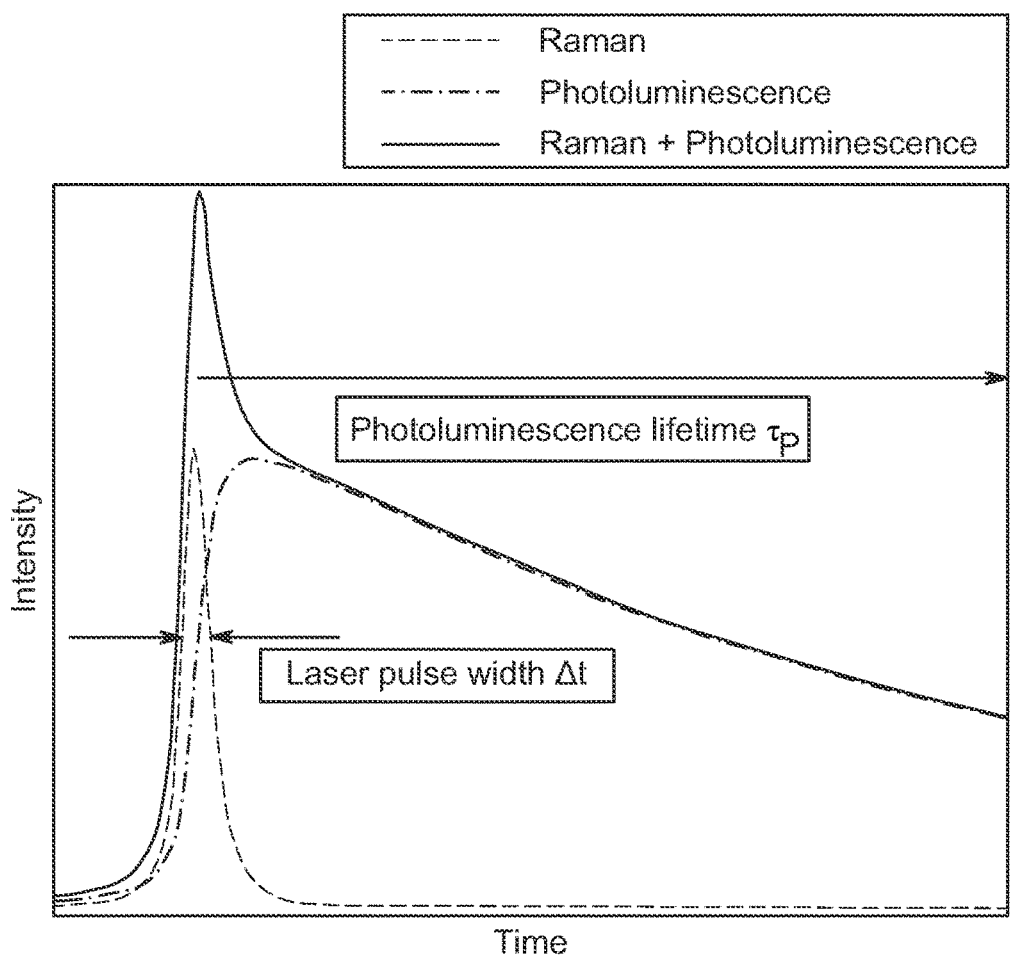
FIG. 3 is a graph illustrating photo intensity over time of a Raman signal and a photoluminescence signal in response to a laser pulse, showing that Raman scattering occurs essentially simultaneously with incident excitation light, whereas subsequent photoluminescence (e.g., fluorescence) occurs approximately hundreds of picoseconds to tens of nanoseconds after the excitation light hits the sample target.

FIG. 3 illustrates photo intensity over time of a Raman signal and a photoluminescence signal (e.g., fluorescence) in response to a laser pulse, showing that Raman scattering occurs essentially simultaneously with incident excitation light, whereas subsequent photoluminescence (e.g., fluorescence) occurs approximately hundreds of picoseconds to tens of nanoseconds after the excitation light hits the sample target.

Accordingly, the controller 102 can be configured to provide a gating parameter (e.g., sub-nanosecond gating), that is synchronized to the provided laser pulse in such a way that the imaging sensor 104 detects nearly only the Raman scattering signal associated with the laser pulse and blocks much of the interfering fluorescence emissions. This can beneficially enhance the signal-to-noise ratio in Raman spectroscopy applications.

Figure 4:
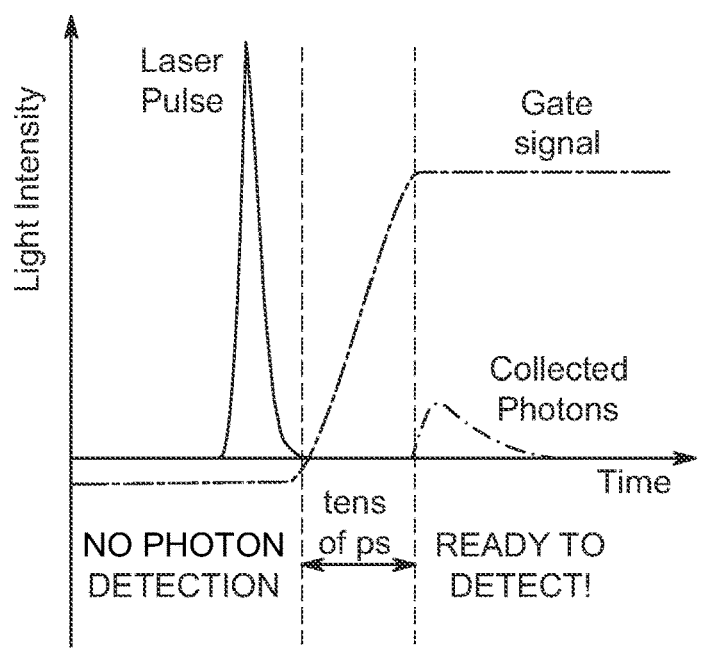
FIG. 4 is a graph illustrating how time gating can be utilized to block light from the excitation laser pulse and to initiate photon detection in sync with the remaining fluorescence emission of the target fluorophore.

In another example, the imaging system 100 may be configured for a time-delayed detection of fluorescence mode. In a time-delayed detection of fluorescence mode, the time-gating may be tuned to capture fluorescence emissions of a target while substantially blocking excitation light signals. FIG. 4 illustrates how time gating can be utilized to block light from the excitation laser pulse and to initiate photon detection in sync with the remaining fluorescence emission of the target fluorophore to enable the imaging sensor to capture the fluorescence emission after the excitation light ceases.

As shown, initiation of the gate signal can be synchronized with the laser pulse such that the gate signal does not reach the required threshold until a desired time period (e.g., tens of picoseconds) has passed following the end of the excitation pulse. At this point, the imaging sensor 104 is ready to detect and count photons. This type of time gating can beneficially improve the signal-to-noise ratio in fluorescence applications. In at least some applications, such time gating allows the fluorescence emission to be captured without the need to use spectral filtering of excitation light.

The rapid/real-time switching in modes based on time gating may be automatic and/or triggered by a predetermined event or threshold. In some embodiments, a counting mode may be utilized during sample navigation. Upon occurrence of the event or threshold (e.g., a time or number of photons after light pulse, or cessation of light pulse), the system can automatically switch into Raman or fluorescence mode.

In some embodiments, the system 100 is configured to alternate between Raman and fluorescence modes via time gating in order to generate baselines of the (spectrally resolved) Raman and fluorescence signals. The time gating may be based on a single time position. For example, the system may switch from only actively counting photons before the time position to only actively counting photons after the time position. Alternatively, time gating may be based on multiple different time positions. For example, gating for Raman mode and gating for fluorescence mode do not necessarily need to share the same gating time positions. In some embodiments, the real-time photon detection is synchronized with the pulsed light source so as to enable a mode that successively alternates between Raman and fluorescence detection, and thereby enables simultaneous viewing of the Raman and fluorescence signals in separate images.

In another example, the imaging system 100 may be configured for repetitive sampling of pulsed events with shifting time gating, such as in FLIM and FRAP. In FLIM applications, the lifetime of the target fluorophore, rather than its intensity, is the desired information obtained. FLIM is often utilized in the study of living tissues and cells at the molecular level. Fluorescence lifetimes can be sensitive to variables such as pH, temperature, gas (e.g., oxygen) concentrations, and viscosity, and measuring lifetimes can thus enable the detection of effects that may not be observable based on fluorescence intensity alone. A related advantage of lifetime augmented measurements over simple intensity measurements is the relative independence of the lifetime from the fluorophore concentration.

Variable time gating may be utilized in FLIM to obtain photon counts at different time fractions following excitation pulse. Recordings may be repeated for multiple laser pulses at different, shifting time delays in order to derive a fluorescence decay curve or other fluorescence decay parameters. Because the imaging system 100 is readily reconfigurable, the time gating parameter can be adjusted to provide the shifting time delays for effective use in FLIM applications.

In FRAP, a sample is labelled with a fluorescent tag. A portion of the sample is intentionally photobleached, and the portion is then monitored to determine the time for a threshold level of fluorescence to return as other portions of the sample (that have not been photobleached) diffuse into the monitored portion. FRAP is thus useful for determining diffusion kinetics through tissues or cells. The system 100 may be utilized in FRAP by counting photons until arrival times reach a threshold. As with FLIM, variable time gating may be utilized to construct a detailed histogram of photons at different arrival time periods. This data may then be utilized to derive a recovery time constant or other recovery time parameters.

FLIM and/or FRAP may also be utilized in conjunction with protocol-based intensity thresholds. For example, navigation may be accomplished while in a photon counting mode, and FLIM or FRAP counting does not begin until after a specified threshold (e.g., arrival time or photon count) is reached.

Integration & Photon Detection Modes

The ability to rapidly switch between different operating modes can also be utilized in applications where an integration or calibration mode precedes a photon counting mode. Examples where this can be beneficial include FCS applications, including iFCCS applications. In FCS, the aim is to measure fluctuations in fluorescence intensity over time, allowing the measure of concentration and diffusion coefficients of fluorophores within a sample, including within cellular structures and/or live cells.

Figure 5:
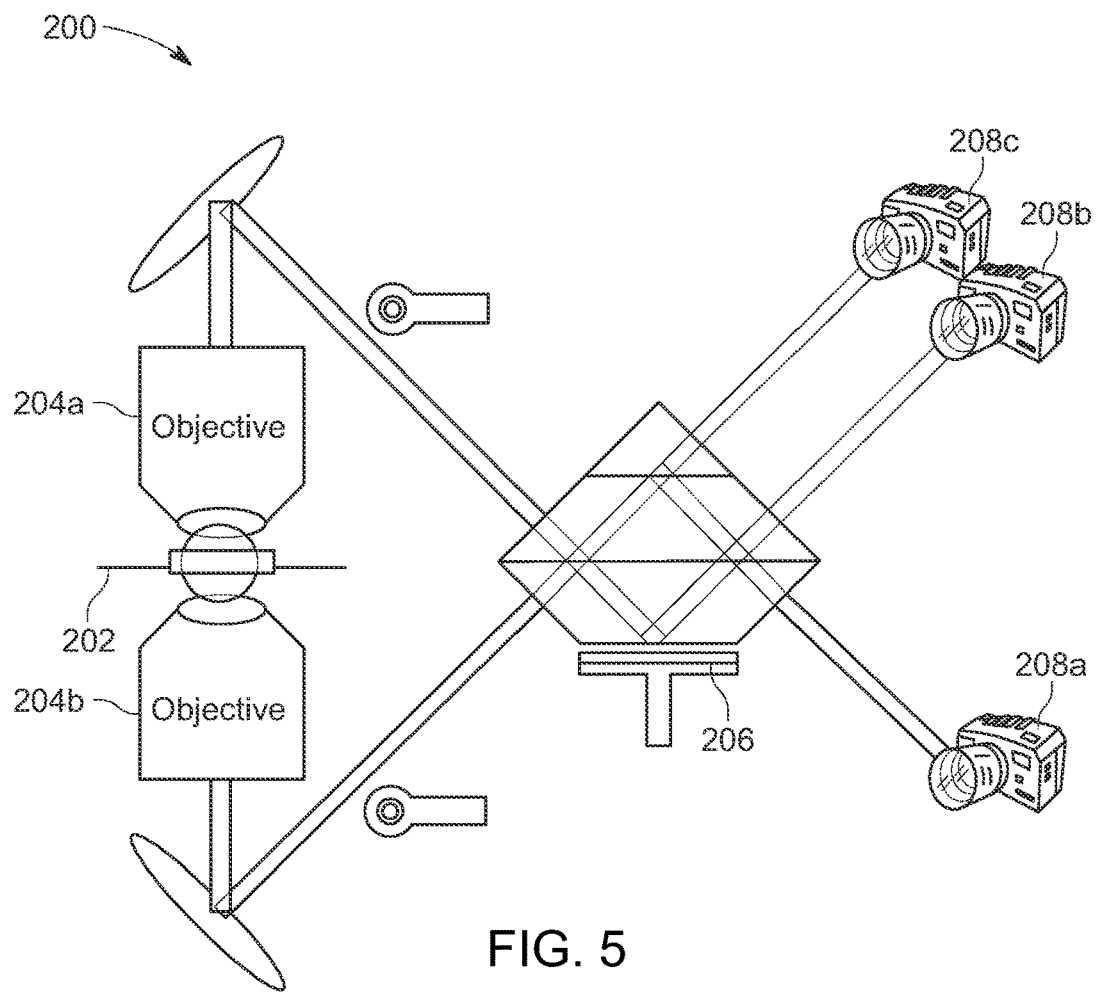
FIG. 5 illustrates an imaging system configured as an interferometric photoactivated localization microscope (iPALM) for use in interferometric fluorescence cross correlation spectroscopy (iFCCS) applications.

FIG. 5 illustrates an imaging system 200 configured as an interferometric photoactivated localization microscope (iPALM) for use in iFCCS applications. The imaging system 200 may include features of the imaging system 100 described above, and the above description should be understood as applicable to the imaging system 200 as well.

The imaging system 200 includes a sample region 202 and a pair of objectives 204a and 204b on either side of the sample region 202. Separate optical paths extend from objectives 204a and 204b to a three-way beam splitter 206, and then to three separate imaging sensors (synchronized in time) 208a, 208b, and 208c.

iFCCS is based on the fact that a photon emitted from the sample region 202 is able to simultaneously travel two distinct optical paths, which are subsequently recombined so that the photon interferes with itself. Differences in path length can be determined by the intensity pattern of the recombined light waves. That is, waves that remain in phase (due to similar optical paths) will undergo constructive interference while waves that are out of phase (due to differences in optical paths) will undergo destructive interference. Intermediate intensity patterns can be utilized to determine relative phase differences. Accordingly, as a fluorophore in the sample region 202 moves through the sample (e.g., in the z direction) over time, the differential lengths of the optical paths traversed by the emitted photons will also change over time and thus the interferometric signal will change over time.

Figure 6:
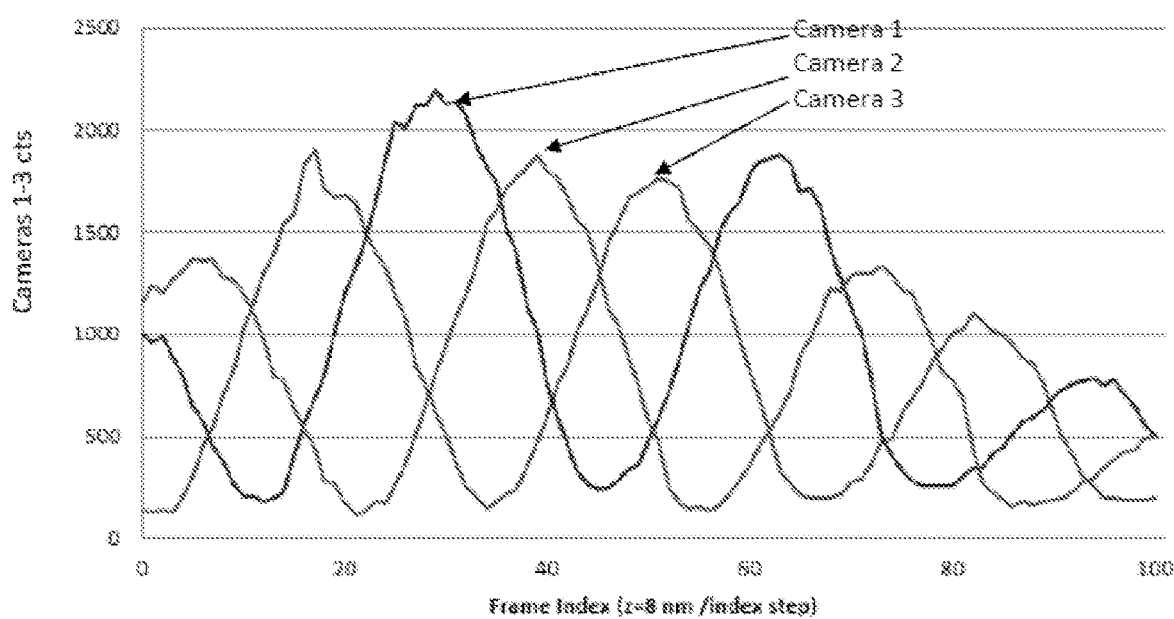
FIG. 6 illustrates exemplary results of an integration/calibration operation using the imaging system of FIG. 5.

Interferometric applications such as iFCCS require a 3D optics response of the microscope to monitor the instrument's performance prior to a proper acquisition of the interferometric fluorescence signals. Ideally, the multiple imaging sensors 208a, 208b, and 208c are aligned at sub-pixel precision. During an integration/calibration mode, the fluorescence emission of one or more fiducials are measured and the imaging sensors 208a, 208b, and 208c are adjusted to until properly aligned. FIG. 6 illustrates exemplary results of an integration/calibration operation using the imaging system of FIG. 5, showing interferometric intensity signals of a coherent emitter as a function of its axial position on cameras/sensors 208a-208c, and showing intentional 120° phase difference between each of the sensors 208a-208c. The cameras/sensors 208a-208c can be synchronized with a precision of about 10 ns or better.

During the integration/calibration mode, a relatively higher bit-depth (e.g., 8-bit or higher) may be utilized. Following calibration, the imaging system 200 may be rapidly switched to a photon counting mode at a lower bit-depth (e.g., 1-bit) to detect the arrival time of fluorescence photons from the sample. The interferometric signal may then be utilized to generate a volume map of diffusion constants per voxel based on arrival times of photons.

The imaging sensors should be operated fast enough to coincide with diffusion of the molecular process being analyzed. The imaging system 200 is beneficially configured to allow rapid switching between the integration mode for instrument calibration and the photon detection mode for obtaining the photon counts from the sample. The imaging system 200 beneficially enables implementation of the integration mode with the high-speed photon counting mode.

Figure 7A:
FIGS. 7A-7C illustrate exemplary results of a photon counting operation, performed following integration/calibration, using the imaging system of FIG. 5.
Figure 7B:
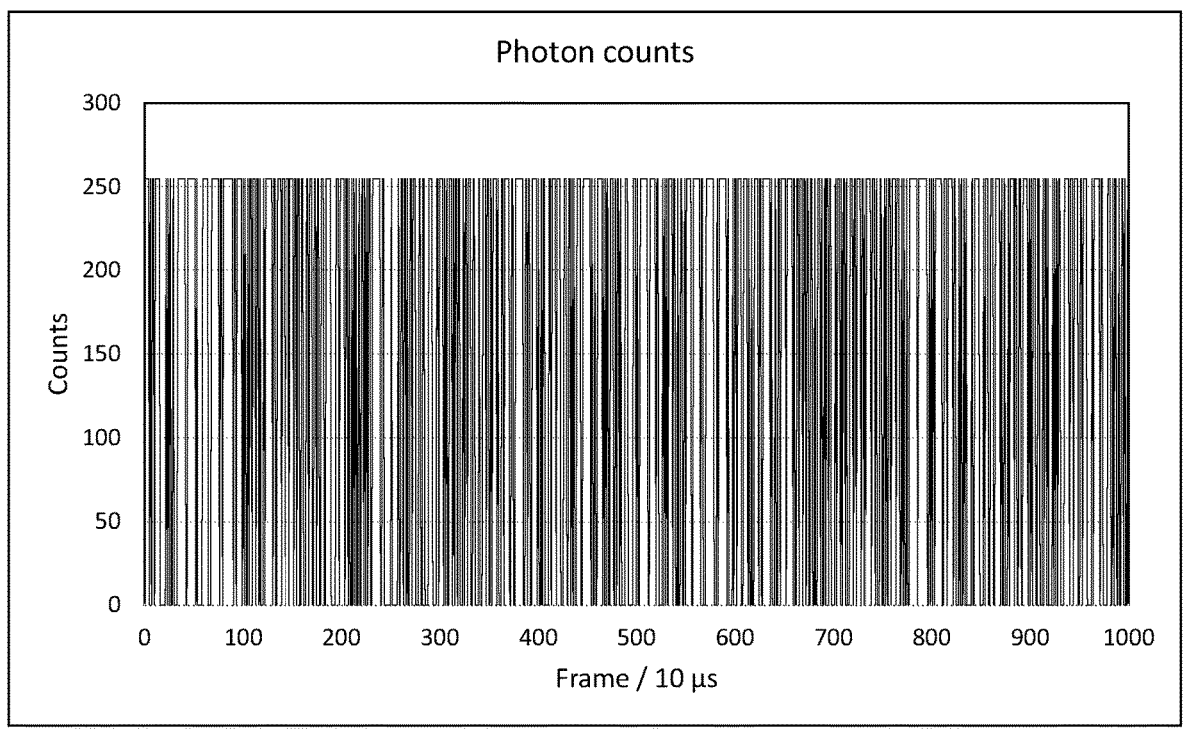
Figure 7C:
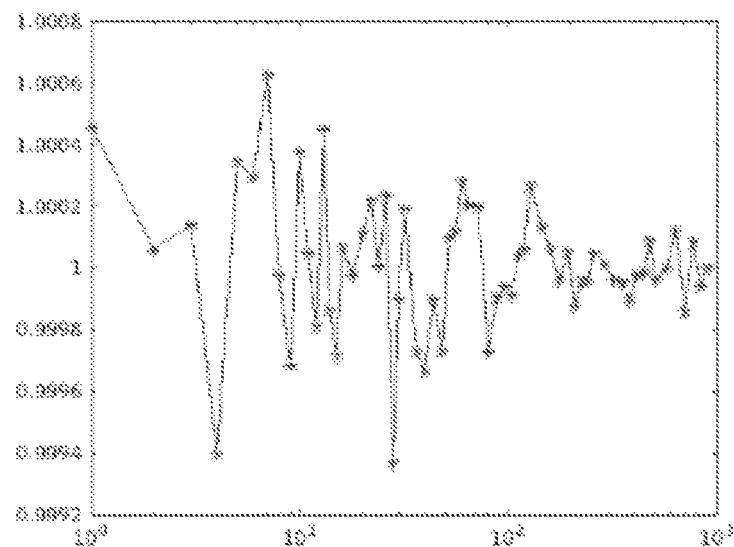

FIGS. 7A-7C illustrate exemplary results of a photon counting operation, performed following integration/calibration, using the imaging system of FIG. 5. FIG. 7A shows an example 1-bit image (32×32 pixel size) obtained during photon counting mode. FIG. 7B shows white noise photon counting at 1,000 frames at a 10 microsecond time window of a pixel, and FIG. 7C shows the associated correlation function of white noise.

Three-Dimensional Sectioning

The imaging system 100 may also be utilized in 3D sectioning applications such as spinning disk confocal microscopy, and/or structured illumination microscopy (SIM) applications. Accurate synchronization of the light source and image sensor allows 3D molecular imaging using photon detectors.

Additional Computer System Details

It will be appreciated that in this description and in the claims, the term "computer system", "controller", or "computing system" is defined broadly as including any device or system—or combination thereof—that includes at least one physical and tangible processor and a physical and tangible memory capable of having stored thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multiprocessor systems, network PCs, distributed computing systems, datacenters, message processors, routers, and switches.

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media, which can also be referred to as hardware storage devices.

The computing system also has thereon multiple structures often referred to as an "executable component." For instance, the memory of computing system can include an executable component for operating the controller and/or functions of the elevation systems and/or circular reciprocation systems disclosed herein. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. For example, a user interface can be used by a user to dictate their desired operation of the modified magnet assembly. The user interface may include output mechanisms as well as input mechanisms (e.g., I/O Devices). The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product. For the absence of doubt, such computer-readable storage media can also be termed "hardware storage devices," which are physical storage media not transmission media.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

CONCLUSION

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. An imaging system configured to enable rapid switching between operational modes, the imaging system comprising:
an imaging system controller, the imaging system controller comprising
a reprogrammable logic device comprising memory, and
a high-speed data link;
optionally a suitable light source for fluorescence imaging;
an imaging sensor communicatively coupled to the controller; and
a host device communicatively coupled to the controller via the high-speed data link, the host device comprising one or more processors and one or more hardware storage devices having stored thereon computer-executable instructions that when executed by the one or more processors cause the host device to
instruct the imaging system controller to operate the imaging sensor according to a first operational mode,
receive imaging data from the imaging system controller during operation of the first operational mode,
reconfigure in real-time the reprogrammable logic device of the imaging system controller according to a second operational mode,
instruct the imaging system controller to operate the imaging sensor according to the second operational mode, the second operational mode differing from the first operational mode, wherein the second operational mode comprises a higher-speed photon counting mode, and
receive imaging data from the imaging system controller during operation of the second operational mode.

2. The imaging system of claim 1, wherein the imaging sensor is a single-photon detector.

3. The imaging system of claim 1, wherein the host device operates to switch the imaging system from the first operational mode to the second operational mode by adjusting a time gating parameter and/or operates to adjust a time gating parameter during the first operational mode, the second operational mode, or both.

4. The imaging system of claim 1, wherein the first and/or the second operational mode comprise one of Raman spectroscopy or time-delayed detection of fluorescence after light pulse excitation.

5. The imaging system of claim 4, wherein the first or second operational mode comprises a Raman spectroscopy mode, and wherein the Raman spectroscopy mode comprises high-speed gating to separate background fluorescence emissions from Raman scattering signals, wherein the high-speed gating is within a range of hundreds of picoseconds to tens of nanoseconds.

6. The imaging system of claim 5, wherein the high-speed gating is less than about 1 nanosecond.

7. The imaging system of claim 1, wherein the first or second operational mode comprises a time-delayed detection of fluorescence mode, and wherein the time-delayed detection of fluorescence mode comprises a time gating delay configured to capture fluorescence emissions while substantially blocking excitation light signals, wherein the time gating delay is synchronized to an excitation light source signal so as to enable the imaging sensor to capture the fluorescence emission after the excitation light ceases.

8. The imaging system of claim 7, wherein the fluorescence emission is captured without the use of spectral filtering of excitation light.

9. The imaging system of claim 5, wherein the first operational mode is a Raman spectroscopy mode, and the second operational mode is a time-delayed detection of fluorescence mode, or wherein the first operational mode is a time-delayed detection of fluorescence mode and second operational mode is a Raman spectroscopy mode, wherein the system is configured to successively alternate between Raman and fluorescence modes.

10. The imaging system of claim 4, wherein the first and second operational modes comprise different portions of a shifting time gating delay, wherein the shifting time gating delay is associated with a fluorescence lifetime imaging microscopy FLIM) mode or a fluorescence recovery after photobleaching (FRAP) mode.

11. The imaging system of claim 1, wherein the first operational mode comprises a calibration/integration operation.

12. The imaging system of claim 1, wherein the photon counting mode comprises interferometric fluorescence cross correlation spectroscopy (iFCCS).

13. The imaging system of claim 1, wherein the system first or second operational mode comprises counting a number of fluorescent photons until a threshold is reached and to then cease exposure to thereby limit photobleaching.

14. The imaging system of claim 1, wherein the first and/or second operational mode comprises a three-dimensional sectioning operation.

15. The imaging system of claim 1, wherein the first and/or second operational mode comprises a Western blotting operation, wherein at least a portion of the Western blotting operation is performed without illumination from a light source.

16. The imaging system of claim 1, wherein the high-speed data link is configured to provide a transfer rate of greater than 1 Gbps, or about 5 Gbps or more, or about 15 Gbps or more, or about 25 Gbps or more, or about 35 Gbps or more, or about 45 Gbps or more, or about 55 Gbps or more, or about 64 Gbps or more.

17. The imaging system of claim 1, wherein the one or more input/output connectors comprise a plurality of pins configured as differential pairs.

18. The imaging system of claim 1, wherein the controller includes one or more input/output connectors configured for low-voltage differential signaling (LVDS).

19. The imaging system of claim 17, wherein the plurality of pins comprises at least 128 pins, or at least 256 pins, or at least about 300 pins.

20. The imaging system of claim 1, further comprising one or more light sources.

* * * * *